United States Patent
Nguyen et al.

(10) Patent No.: US 9,825,315 B2
(45) Date of Patent: Nov. 21, 2017

(54) HYDROPHOBIZED GAS DIFFUSION LAYERS AND METHOD OF MAKING THE SAME

(71) Applicant: UNIVERSITY OF KANSAS, Lawrence, KS (US)

(72) Inventors: Trung Van Nguyen, Lawrence, KS (US); Xuhai Wang, Drexel Hill, PA (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 311 days.

(21) Appl. No.: 14/372,824

(22) PCT Filed: Jan. 18, 2013

(86) PCT No.: PCT/US2013/022036
§ 371 (c)(1),
(2) Date: Jul. 17, 2014

(87) PCT Pub. No.: WO2013/112360
PCT Pub. Date: Aug. 1, 2013

(65) Prior Publication Data
US 2015/0024300 A1    Jan. 22, 2015

Related U.S. Application Data

(60) Provisional application No. 61/591,357, filed on Jan. 27, 2012.

(51) Int. Cl.
*H01M 8/04082* (2016.01)
*H01M 8/0234* (2016.01)
(Continued)

(52) U.S. Cl.
CPC ..... *H01M 8/04201* (2013.01); *H01M 8/0234* (2013.01); *H01M 8/0245* (2013.01);
(Continued)

(58) Field of Classification Search
None
See application file for complete search history.

(56) References Cited

U.S. PATENT DOCUMENTS 2,786,874 A    3/1957    Teeters et al.
3,397,087 A    8/1968    Yoshizawa et al.
(Continued)

FOREIGN PATENT DOCUMENTS

CN    102104159 A    6/2011
CN    102456891 A    5/2012

OTHER PUBLICATIONS

International Search Report and Written Opinion dated Mar. 28, 2013 from priority PCT/US2013/022036 filed Jan. 18, 2013 (16 pgs).

*Primary Examiner* — Sarah A Slifka
(74) *Attorney, Agent, or Firm* — Stinson Leonard Street LLP (57) ABSTRACT

A gas diffusion layer having a first major surface and a second major surface which is positioned opposite to said first major surface and an interior between said first and second major surfaces is formed. The gas diffusion layer comprises a porous carbon substrate which is directly fluorinated in the interior and is substantially free of fluorination on at least one of the first major surfaces or the second major surfaces, and preferably both surfaces. The gas diffusion layer may be formed using protective sandwich process during direct fluorination or by physically or chemically removing the C—F atomic layer at the major surfaces, for example by physical plasma etching or chemical reactive ion etching.

26 Claims, 6 Drawing Sheets

(51) Int. Cl.
*H01M 8/0245* (2016.01)
*H01M 8/1004* (2016.01)
*H01M 8/1018* (2016.01)

(52) U.S. Cl.
CPC .. *H01M 8/1004* (2013.01); *H01M 2008/1095* (2013.01); *H01M 2300/0082* (2013.01); *Y02P 70/56* (2015.11)

(56) References Cited

U.S. PATENT DOCUMENTS

| | | |
|---|---|---|
| 3,674,432 A | 7/1972 | Margrave et al. |
| 3,929,918 A | 12/1975 | Meshri et al. |
| 3,929,920 A | 12/1975 | Komo et al. |
| 5,116,592 A | 5/1992 | Weinberg |
| 5,866,920 A | 2/1999 | Matsumoto et al. |
| 6,020,083 A | 2/2000 | Breault et al. |
| 6,149,730 A | 11/2000 | Matsubara et al. |
| 7,410,719 B2 | 8/2008 | Chida et al. |
| 7,560,180 B2 | 7/2009 | Yoshida et al. |
| 2003/0098237 A1 | 5/2003 | Clark et al. |
| 2004/0076879 A1 | 4/2004 | Ovshinsky et al. |
| 2004/0086775 A1 | 5/2004 | Lloyd et al. |
| 2008/0166542 A1 | 7/2008 | Sung et al. |
| 2011/0014544 A1 | 1/2011 | Lee et al. |
| 2011/0027492 A1 | 2/2011 | Mekala et al. |
| 2011/0136044 A1 | 6/2011 | Han et al. |
| 2011/0189446 A1 | 8/2011 | Cross et al. |
| 2011/0244358 A1 | 10/2011 | Yamauchi et al. |

HYDROPHOBIZED GAS DIFFUSION LAYERS AND METHOD OF MAKING THE SAME

CROSS-REFERENCE TO RELATED APPLICATIONS

This application is based on and claims priority to U.S. Non-Provisional Application Ser. No. 61/591,357 filed on Jan. 27, 2012, which is hereby incorporated herein by reference.

BACKGROUND OF THE INVENTION

The present invention relates to gas diffusion layers ("GLDs"), such as those which may be useful in the manufacture of fuel cells.

BRIEF SUMMARY OF THE INVENTION

The present invention is directed to a gas diffusion layer for use in a gas diffusion device, such as a proton exchange membrane fuel cell. The gas diffusion layers are designed to be positioned adjacent to a catalyst layer in the fuel cell. The gas diffusion layer exhibits electron conductivity and gas diffusibility. The gas diffusion layer has a first major surface and a second major surface which is positioned opposite to the first major surface and having an interior between the first and second major surfaces. The gas diffusion layer comprises a porous carbon substrate which is directly fluorinated in the interior and is substantially free of fluorination on at least one of the first major surfaces or said second major surfaces.

In one aspect, at least 50 percent of the surface area of the major surface that is designed to be in contact with the catalyst layer is not fluorinated. For example, at least about 50, 55, 60, 65, 70, 75, 80, 85, 90, 92, 94, 96, 98, or 100% (or some range therebetween) of the surface area of the major surface that is designed to be in contact with the catalyst layer is not fluorinated. As another example, at least about 50, 55, 60, 65, 70, 75, 80, 85, 90, 92, 94, 96, 98, or 100% (or some range therebetween) of the surface area of both major surfaces is not fluorinated.

In another aspect, the gas diffusion layer contains less than about 2 at % fluorine. For example, the amount of fluorine in the gas diffusion layer is less than about 1.5, 1.4, 1.3, 1.2, 1.1, 1.0, 0.9, 0.8, 0.7, 0.6, 0.5, 0.4, or 0.3 at % (or some range therebetween).

In another aspect, the gas diffusion layer contains less than about 2 wt % fluorine. For example, the amount of fluorine in the gas diffusion layer is less than about 1.5, 1.4, 1.3, 1.2, 1.1, 1.0, 0.9, 0.8, 0.7, 0.6, 0.5, 0.4, or 0.3 wt % (or some range therebetween).

In another aspect, the gas diffusion layer has a mean pore size after direct fluorination of about 100 microns or less (e.g., about 100, 90, 80, 70, 60, 50, 40, 30, 20, 10 microns or less).

In another aspect, the present invention is directed to a fuel cell or device containing the gas diffusion layers of the present invention. The fuel cell comprises a membrane-electrode assembly including a hydrogen ion conductive polymer electrolyte membrane; a pair of catalyst layers sandwiching the polymer electrolyte membrane; and a pair of gas diffusion layers of the present invention disposed on the outer surfaces of the catalyst layers.

In another aspect, the present invention is directed to a method for making the gas diffusion layer. The method comprises the steps of providing a porous carbon substrate having a first major surface and a second major surface which is positioned opposite to the first major surface and having an interior between the first and second major surfaces; protecting at least one of the first major surface and the second major surface by contacting at least one surface with a protective layer; directly fluorinating the porous carbon substrate with fluorine gas; and removing the protective layer from at least one surface. The interior of the gas diffusion device is fluorinated and at least one major surface (preferably both major surfaces) is not substantially fluorinated.

In still another aspect, the direct fluorinating step occurs at a temperature of about 300 to 500° C. (e.g., about 300, 310, 320, 330, 340, 350, 360, 370, 380, 390, 400, 410, 420, 430, 440, 450, 460, 470, 480, 490, or 500° C. or some range therebetween).

In yet another aspect, the direct fluorinating step occurs using a mixture of fluorine gas and an inert gas. The inert gas is preferably selected from the group consisting of argon and nitrogen. The amount of fluorine in the gaseous mixture is preferably between about 1 and 50% (e.g., about 1, 5, 10, 15, 20, 25, 30, 35, 40, 45, or 50% or some range therebetween). In one aspect, the direction fluorinating step includes using a mixture of about 10 to 20% fluorine and 80 to 90% argon.

In a further aspect, the direct fluorinating step occurs at atmospheric pressure or an elevated pressure. Exemplary pressures include 1, 2, 3, 4, or 5 atm.

In another aspect, the direct fluorinating step occurs for about 10 minutes to 5 hours (e.g., about 10, 20, 30, 40, 50, 60, 90, 120, 150, 180, 210, 240, 270, or 300 minutes or some range therebetween).

In yet another aspect, during the direct fluorinating step, the first major surface is protected by contacting the first major surface with a first protective layer and the second major surface is protected by contacting the second major surface with a second protective layer such that the porous carbon substrate is sandwiched between the first protective layer and the second protective layer.

In another aspect, during the direct fluorinating step, the protective layer(s) are comprised of the same material comprising the porous carbon substrate. The protective layers may also be comprised of a different material, provided that protective layers are capable of contacting substantially all of the first or second major surfaces and are gas permeable. Theoretically, any porous materials that can withstand the temperature and fluorination environment, like porous glass, quartz, or Teflon, may be used.

In an alternative embodiment, the major surface(s) of the porous carbon substrate are not protected during the direct fluorination step. Thus, during the direct fluorination process, the outer carbon atomic layer of the carbon fibers are fluorinated. In this embodiment, the outer carbon atomic layers of the carbon fibers forming at least one of first and second major surfaces (preferably both surfaces) are removed such that the interior of the gas diffusion device is fluorinated and at least one major surface (preferably both major surfaces) is not substantially fluorinated. The removing step may be performed by physical or chemical methods, for example sanding, physical plasma etching with an argon plasma, or reactive ion etching.

In another aspect, the gas diffusion layer may be comprised of a single layer of material or a plurality of layers. In one aspect, the gas diffusion layer is a bilayer comprising a macroporous substrate and a microporous substrate. For example, the gas diffusion layer may comprise a macroporous carbon substrate adjacent to a microporous carbon substrate (which is typically comprised of carbon powder mixed with polytetrafluoroethylene ("PTFE")). The gas diffusion bilayer may be directly fluorinated using the methods discussed herein (e.g., a sandwich method or physical/chemical removal of the outer carbon atomic layers, such as by sanding). In such an embodiment, the gas diffusion layer is a bilayer having a first major surface comprised of the microporous carbon substrate and a second major surface comprised of the macroporous carbon substrate which is positioned opposite to the first major surface and having an interior between the first and second major surfaces. The gas diffusion layer comprises a porous carbon substrate which is directly fluorinated in the interior and is substantially free of fluorination on at least one of the first major surfaces or second major surfaces. In another aspect, at least 50 percent of the surface area of the major surface of the microporous carbon substrate that is designed to be in contact with the catalyst layer is not fluorinated. For example, at least about 50, 55, 60, 65, 70, 75, 80, 85, 90, 92, 94, 96, 98, or 100% (or some range therebetween) of the surface area of the major surface of the microporous layer is not fluorinated. As another example, at least about 50, 55, 60, 65, 70, 75, 80, 85, 90, 92, 94, 96, 98, or 100% (or some range therebetween) of the surface area of both major surfaces (macroporous and microporous substrates) is not fluorinated.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

A fuel cell is basically a generator apparatus that uses the reverse reaction of the water electrolysis to convert chemical energy into electric energy. Since the fuel cell has the advantages of low operation temperature, quick start, high energy density, low pollution, and a wide range of applications, the fuel cell has a high commercial value. It has become a successively developed and promoted technology all over the world. The commonly seen fuel cell includes the phosphoric acid fuel cell, direct methanol fuel cell, alkaline fuel cell, molten carbonate fuel cell, solid oxide fuel cell, and proton exchange membrane fuel cell.

Figure 1:
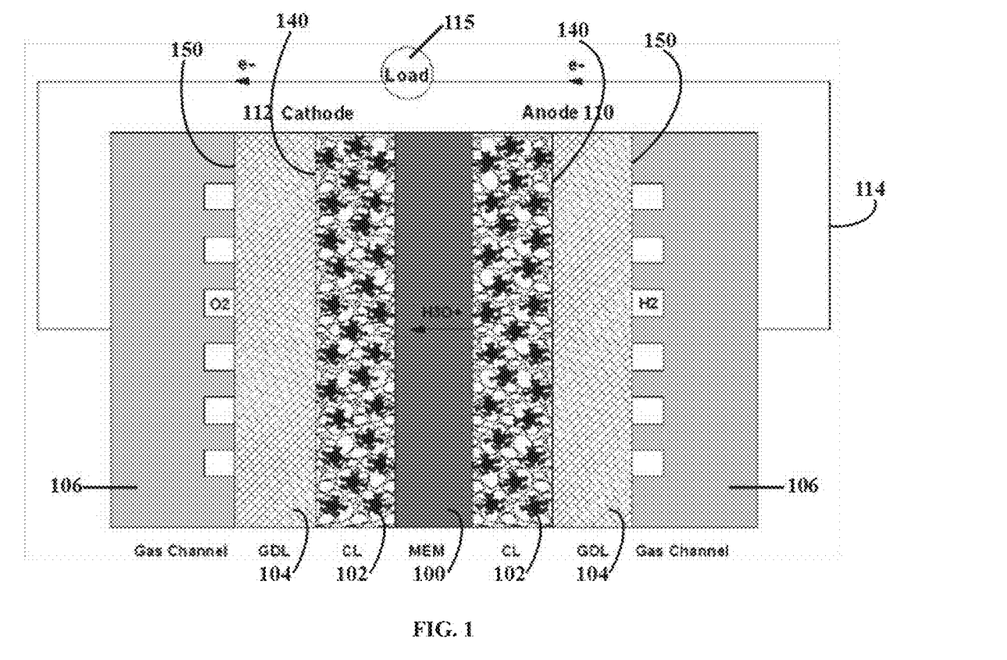
FIG. 1 is a cross-sectional view of an internal structure of a typical proton exchange membrane fuel cell ("PEMFC").

FIG. 1 is a cross-sectional view of an internal structure of a typical proton exchange membrane fuel cell ("PEMFC"). As shown in FIG. 1, the PEMFC mainly includes a proton exchange membrane 100, catalyst layers 102, gas diffusion layers 104, and bipolar plates 106. During the PEMFC operation, the oxidation reaction of $H_2$ is taking place at the anode 110, and the reduction reaction of $O_2$ is taking place at the cathode 112. The reactant gas $H_2$ at the anode 110 is decomposed into hydrogen ions ($H^+$) and electrons ($e^-$) in the presence of a catalyst. The electrons ($e^-$) escape from the anode 110, flow through the cell external circuit 114 and load 115, then reach the cathode 112. Meanwhile, the hydrogen ions ($H^+$) are transferred from the anode 110 to the cathode 112 through the proton exchange membrane 100. The hydrogen ions ($H^+$) and the electrons ($e^-$) combine with the oxygen molecules ($O_2$) at the cathode 112 to produce water ($H_2O$).

During the fuel cell reaction, the $H_2O$ molecules will be continuously transferred from the anode 110 to the cathode 112 by electroosmotic drag. If the water cannot be supplied at adequate amount to the anode, the proton exchange membrane 100 will become excessively dry, the $H^+$ conducting capability of the membrane will be reduced, and the power output of the fuel cell will be significantly reduced. Meanwhile, a great amount of water ($H_2O$) will be produced by the oxygen reduction reaction ("ORR") at the cathode 112. If the water transferred from the anode to the cathode by electroosmotic drag and produced by ORR cannot be adequately discharged from the cell, the catalyst layer 102 and the gas diffusion layer 104 at the cathode 112 will be flooded with water. The gas diffusion layer filled with water becomes a diffusion barrier of oxygen. It retards the oxygen getting into the catalyst layer and the cell output power is significantly reduced. Therefore, controlling and maintaining the water balance in the cathode 112 and the anode 110 and keeping the gas transferring freely inside the electrodes, are critical for maintaining the performance of the PEMFC at its optimal condition.

The gas diffusion layer 104 is located between the catalyst layer 102 and the gas flow path. At the catalytic sites on each electrode, it is the gas diffusion layer 104 that provides both a path of electrical conduction and passage for reactants and products, such as hydrogen, oxygen, and water. That is, the gas diffusion layer is required to have high reaction gas permeability, high water permeability, and high electron conductivity.

The gas diffusion layer 104 must be porous in nature. The word porous generally refers to the volume of interstices of a material relative to the volume of the mass of the material.

Porosity effects the state of permeability of a material, that is the property of a porous material that is the measure of the amount (rate or volume) at which a fluid (liquid or gas) passes through a unit of cross-section of material at a given viscosity, under a unit of gradient pressure. Therefore, at fixed gradient pressure, and viscosity, the permeability of a given material is directly related to its porosity. For purposes of this application, therefore, the terms porosity and permeability may be used interchangeably with the understanding that an increase in porosity (interstitial volume) will normally result in an increase in permeability, and vice versa.

Any suitable gas diffusion layer material may be used in the practice of the present invention. Typically the gas diffusion layer is comprised of sheet or roll good material comprising carbon fibers. Typically, the gas diffusion layer is a carbon fiber construction selected from woven and non-woven carbon fiber constructions. Carbon fiber constructions which may be useful in the practice of the present invention may include: Toray™ Carbon Paper, SpectraCarb™ Carbon Paper, Zoltek™ Carbon Cloth, AvCarb™ P50 carbon fiber paper, and the like. The gas diffusion layer may be provided in sheets, as a roll good, or in any suitable form.

Figure 2:
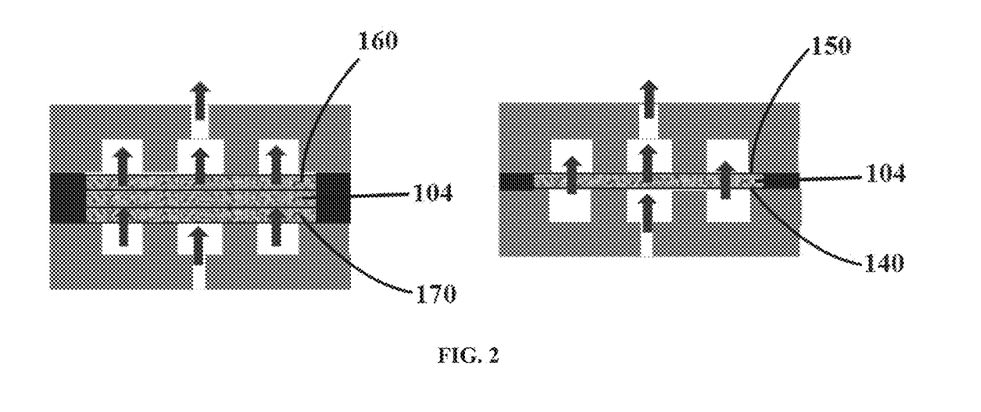
FIG. 2 illustrates the three-layer sandwich and one-layer setup for making the gas diffusion layer of the present invention.

As shown in FIGS. 1 and 2, the gas diffusion layer 104 has a first major surface 140 and an opposite second major surface 150. The thickness of the gas diffusion layer is typically between about 10 and 500 microns, more preferably between about 30 and 300 microns (e.g., about 30, 50, 70, 100, 130, 150, 200, 250, or 300 microns).

In order to prevent the gas diffusion layer from becoming flooded with liquid water in the present invention, the gas diffusion layer material is made more hydrophobic by direct fluorination. However, it has been shown that fluorination increases the ohmic resistance of carbon materials, mainly due to the C—F product on the surface (see Table 1). Thus, if the surface of the gas diffusion layer is in contact with other components like the catalyst layers and flow distributor plates, the resistive C—F surface may lead to higher ohmic resistance in the cell and poorer performance.

TABLE 1

Electronic conductivity of different graphite fluorides

| Composition | Starting graphite | CF (HT) | $CF_{0.8}I_{0.02}$ | $CF_{0.65}I_{0.05}$ | $CF_{0.52}I_{0.06}$ |
|---|---|---|---|---|---|
| Electrical conductivity $\sigma: \Omega^{-1}cm^{-1}$ | 360 | $<10^{-12}$ | $\sim10^{-7}$ | $\sim10^{-6}$ | $\sim10^{-1}$ |

Note:
HT denotes high temperature.

In the present invention, the conductivity of the gas diffusion layer 104 is maintained because at least one of the first major surface 140 and the second major surface 150 is substantially free of fluorination. As used therein, the term "substantially free" means that at least 50 percent of the surface area of the major surfaces (e.g., the surface 140 designed to be in contact with the catalyst layer) is not fluorinated. For example, at least about 50, 55, 60, 65, 70, 75, 80, 85, 90, 92, 94, 96, 98, or 100% of the surface area of the major surface (e.g., the surface 140 that is designed to be in contact with the catalyst layer) is not fluorinated. Most preferably, both major surfaces 140, 150 of the gas diffusion layer 104 are substantially free of fluorination. The degree to which the major surfaces 140, 150 of the gas diffusion layer 104 are fluorinated may be the same or different.

In one aspect, the first and/or second major surfaces 140, 150 of the gas diffusion layer 104 are protected from direct fluorination during the fluorination process. The surfaces may be protected by contacting the surface with a protective layer during the fluorination process. In an exemplary aspect, the first and second major surfaces 140, 150 are protected by sandwiching the gas diffusion layer 104 between two protective layers 160, 170 as generally shown in FIG. 2 (left panel). In a preferred aspect, the protective layers are comprised of the same material used to form the gas diffusion layer 104. That is, the gas diffusion layer 104 is sandwiched between two protective porous carbon substrates 160, 170. In one aspect, the contact involves a compressive force, although that is not required. The porous protective gas diffusion layers 160, 170 on the top and bottom of the gas diffusion layer 104 permit the fluorine gas to penetrate and react with the gas diffusion layer 104 in the middle while protecting its outside major surfaces 140, 150. The fluorination may be performed in either a batch or continuous process. In a continuous process, the protective layers 160, 170 continuously contact the gas diffusion layer 104, and may be under compression.

In another aspect, the present invention is directed to a one-layer method for forming the gas diffusion layer. In this method, the gas diffusion layer 104 is directly fluorinated by exposure to fluorine gas, as generally shown in FIG. 2 (right panel). In general, the gas diffusion layer 104 is typically comprised of carbon fibers having tens of thousands of carbon atomic layers (i.e., typically micron-sized carbon fibers). Direct fluorination results in a C—F covalent bond at the top atomic layer of the carbon atoms (i.e., the internal carbons of the carbon fiber are not fluorinated). If this upper/top atomic C—F layer is removed, the underlying carbon substrate of the carbon fibers may be exposed. Thus, in this embodiment, the fluorinated outside major surfaces 140, 150 of the gas diffusion layer 104 are removed by a physical or chemical method, for example by sanding, physical plasma etching, or chemical reactive ion etching. Physical etching is typically done using an argon plasma. The energetic argon atoms in the plasma remove both the fluorine and carbon atoms on the upper/top atomic C—F layer. The extent of the removal will depend upon the power level and the duration of the etching, and can be readily determined by one skilled in the art. Likewise, chemical reaction ion etching uses plasma and reactive gases like $SF_6$ which can etch the upper/top atomic C—F layer by both physical etching and by reacting with the surface to from a gaseous product. Thus, in one aspect, the upper/top C—F layer is removed by an etching method selected from the group consisting of ion etching, ion beam etching, reactive ion etching, reactive ion beam etching, and combinations thereof. The plasma excitation can for example be performed by supplying microwave electric power, radio frequency electric power, or DC electric power.

The one-layer approach may be used as a batch or continuous process in which there can be two stages. In the first stage, the porous gas diffusion materials 104 can be fed continuously from a roll into a direct fluorinating reactor chamber. After the material comes out of the first stage, it can be fed continuously into the second stage in which the C—F layers of the outer major surfaces 140, 150 can be removed. This alternative method may be more economical than the sandwich approach, which is generally more suitable for batch processes.

Example 1

Figure 3:
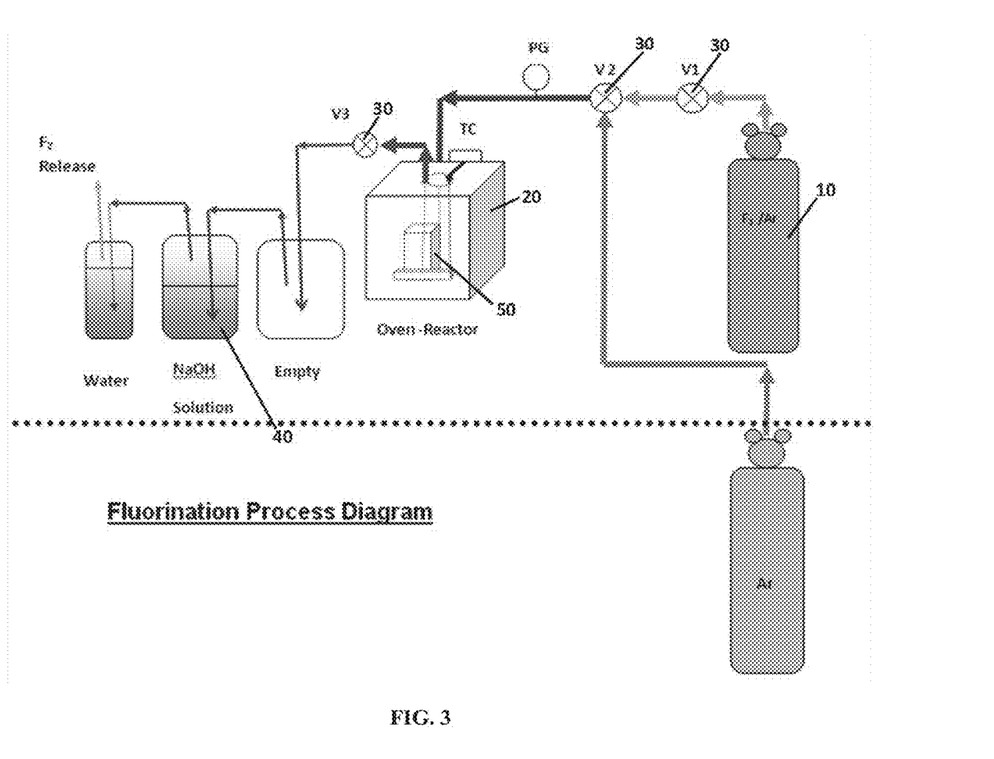
FIG. 3 is a schematic view, illustrating the experimental apparatus used to make the gas diffusion layer of the present invention using direct fluorination.

Experimental Setup:

Pure fluorine gas ($F_2$) was used to react with the gas diffusion layers at temperatures ranging from 400° C. to 550° C. A schematic view of the experimental setup is shown in FIG. 3. The fluorine gas 10 (preferably about 85% argon and 15% fluorine) is introduced into a temperature-controlled nickel reactor 20 at about 1 atm. Prior to and following the fluorination, sufficient nitrogen is supplied as purge gas to flush the air and fluorine out of the nickel reactor. To prevent corrosion of the thermocouple, nickel coated thermocouples are used. Two three-way valves 30 are used to select the flowing gas at different stages of the experiment. A mass flow controller controls the fluorine flow rate. Nickel is preferably used for all parts in contact with fluorine at high temperatures. Other parts of the connections under ambient temperature can be stainless steel. Monel is inert in fluorine below 550° C.

Fluorination is preferably carried out at temperatures above about 350° C., for example about 400° C., 450° C., 500° C., and 550° C. and pressures of about 1 to 5 atm.

Bubbling the exhaust gas through sodium hydroxide solution 40 before it is released into the air captures the un-reacted fluorine gas, by which the highly toxic gas is fully absorbed. The sodium hydroxide solution reacts with fluorine according to the following reactions:

$$2F_2 + 2NaOH \rightarrow OF_2 + 2NaF + H_2O$$

Oxygen difluoride slowly reacts with water to form fluoric acid:

$$OF_2(aq) + H_2O(aq) \rightarrow 2HF(aq) + O_2(g)$$

In a basic solution, the fluoric acid is immediately neutralized by the sodium hydroxide.

$$HF + NaOH \rightarrow NaF + H_2O$$

Thus, the overall reaction may be rewritten as:

$$2F_2 + 4NaOH \rightarrow 4NaF + 2H_2O + O_2$$

In this way, the sodium hydroxide prevents the corrosive fluorine gas from being emitted directly into the air. Alternatively, a closed fluorine recirculation loop (i.e., essentially a semi-batch process) could be used to eliminate fluorine emission during operation, and effluent treatment is only needed at the beginning and at the end of the experiment when the gas in the reactor is purged.

Experimental Procedure:

Direct fluorination is carried out according to the following steps: (1) Flush the nickel reactor with an inert gas (e.g., nitrogen or argon) for about one hour to replace the air in the reacting chamber; (2) Raise the oven temperature to desired value (typically about 300 to 450° C.) until stabilized while continuously flowing the nitrogen to the nickel reactor; (3) Flow fluorine gas into the nickel reactor for about one to three hours to fluorinate the gas diffusion layer in the reactor, and stop heating the nickel reactor when the fluorination reaction is completed; (4) Turn off heater and allow the reactor to cool to room temperature; (5) Switch to the inert gas (e.g., nitrogen or argon) to flush the remaining fluorine from the reactor; and (6) Allow to cool to room temperature before removing the gas diffusion layer from the oven and disassembled to remove the samples.

Figure 4:
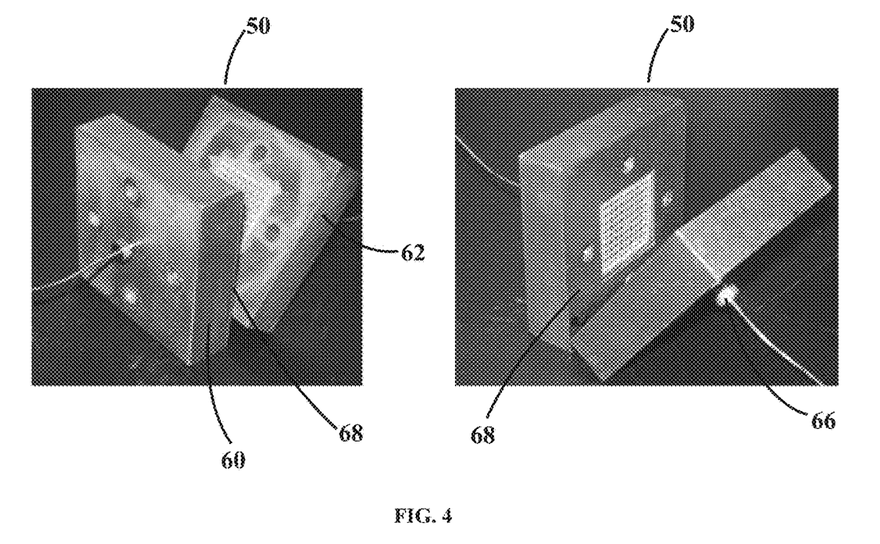
FIG. 4 is a photograph of the sandwich apparatus used to make the gas diffusion layer of the present invention using direct fluorination.

An exemplary three-layer gas diffusion sandwich apparatus 50 is illustrated in FIG. 4. The gas diffusion layer is placed between two stainless steel plates 60, 62 with slots or openings 66 machined into the plates to distribute the fluorine gas. The edges are sealed with a copper gasket 68.

Gas Diffusion Layers:

Commercially available gas diffusion layers with different properties from two different companies (SGL and Toray) will be used in the experiment. See Table 2. These gas diffusion layers are often used in PEM fuel cells. The gas diffusion layer with 0% PTFE will be treated with direct fluorination to validate the hypothesis that making a porous medium hydrophobic by modifying its surface property will cause the capillary pressure (defined here to be the gas pressure, $P_{gas}$, minus the liquid pressure, $P_{liquid}$) to move downward, as compared to moving leftward when it is treated by the pore-filling physical coating method. It will also allow the quantifying separately the effect of the surface treatment on the capillary pressure curve.

TABLE 2

Gas diffusion layers to be evaluated in the experiment

| Company | GDLs | Thickness (μm) | Porosity | PTFE (wt. %) |
|---|---|---|---|---|
| SGL Group[a] | 24 AA | 200 | 0.84 | 0 |
| | 24 BA | 200 | 0.84 | 5 |
| | 24 CA | 200 | 0.84 | 10 |
| | 24 DA | 200 | 0.84 | 20 |
| | 24 DC* | 200 | 0.84 | 20 |
| | 24 EA | 200 | 0.84 | 30 |
| | 24 EC* | 200 | 0.84 | 30 |
| Toray[b] | TGP-H-060 | 190 | 0.8 | 0 |
| | TGP-H-060 | 190 | 0.8 | 10 |
| | TGP-H-060 | 190 | 0.8 | 20 |
| | TGP-H-060 | 190 | 0.8 | 30 |
| | TGP-H-060 | 190 | 0.8 | 40 |

[a]From SGL Group product data sheets.
[b]From Toray Industries, Inc. product data sheets.
*With microporous layer (MPL) on one side Characterization Methods:

Contact Angles

Figure 5:
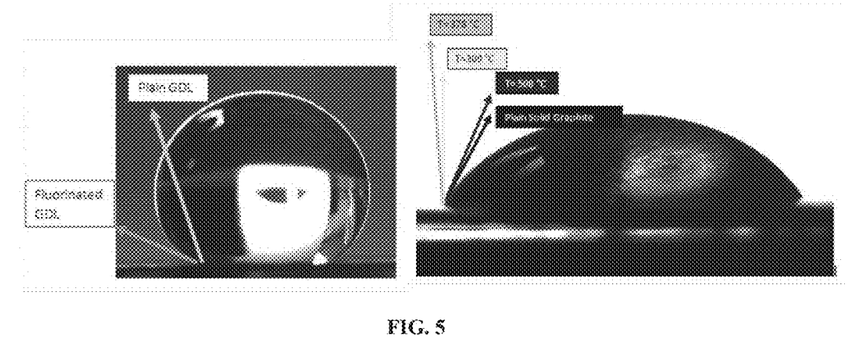
FIG. 5 are photographs illustrating the contact angle of the gas diffusion layer of the present invention. A higher contact angle generally means higher hydrophobicity.

The gas diffusion layers were tested by measuring its outer hydrophobicity using the water contact angle formed between a liquid water droplet and the treated sample outer surface. High hydrophobicity is represented by high contact angle as shown in FIG. 5. The temperature and time that result in the highest contact angle (highest hydrophobicity) are selected. While this test cannot measure the hydrophobicity or contact angle inside the sample, the method is suitable because since all exposed carbon surface reacts with fluorine the inner exposed carbon surface should have the same property as the exposed outer surface.

Figure 6:
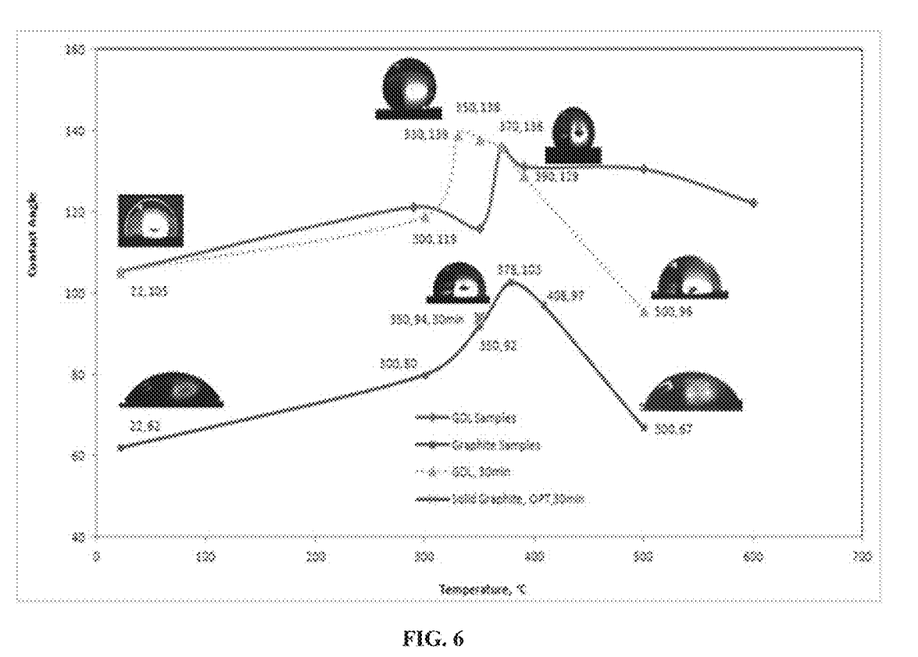
FIG. 6 shows the contact angle as a function of treatment temperature. The first number shown is the treatment temperature and the second number is the water droplet contact angle.

As shown in FIG. 6, from the contact angle results obtained at different temperatures and reaction times, the optimal temperature range and time for the fluorine gas composition and pressure used was determined to be about 350 to 400° C. and about one hour. While shorter or longer times are possible, a one hour reaction time is currently selected to ensure all exposed carbon surfaces are fluorinated.

SEM

Gas diffusion layers with physical coating will be cross-sectioned and examined by SEM to determine the distribution characteristics of the PTFE phase in the porous structures. Of special interest is the interconnectivity and continuity of the PTFE phase needed for optimal gas transport. After fluorination, the surface structure of carbon substrate will be examined by SEM to determine the coating characteristics. Note that the carbon fibers in the gas diffusion media ("GDM"), are in the order of tens of micrometers making their surface easily observable by high resolution SEM.

Figure 7:
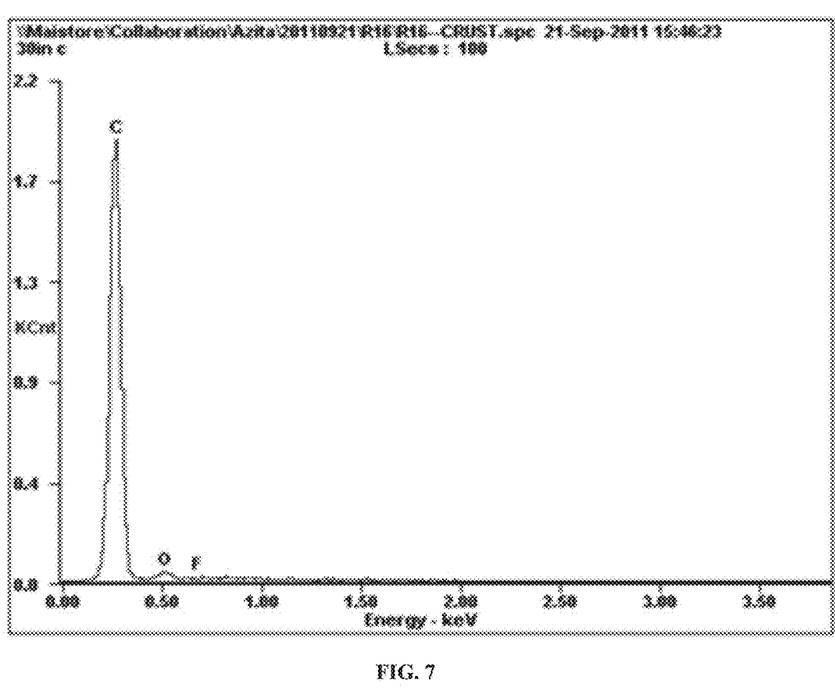
FIG. 7 shows the EDX results of a gas diffusion layer of the present invention using material which has been crushed for analysis.

As shown in FIG. 7, SEM and EDX (Energy Dispersion X-Ray Spectroscopy) were used to analyze the samples to see whether there were any physical changes in the surface and fluorine on the carbon surface that could be detected. The results show that direct fluorination does not change the physical dimensions or shape of the materials. Since the amount of fluorine is quite small, one fluorine atom per carbon on the surface of the carbon fibers which is a tiny fraction of the total carbon in the material, it is not detectable by EDX. However, as shown in the Table 3 below, when the material is crushed to expose the surface inside the substrate the amount of fluorine in the sample is detectable. However, the amount is very small, about 0.2 atomic percent.

TABLE 3

Elemental Analogs of GDL (inventive)

| Elements | Wt % | At % |
|---|---|---|
| C | 98.05 | 98.56 |
| O | 01.63 | 01.23 |
| F | 00.33 | 00.21 |

For comparison, the results of a commercially PTFE treated carbon gas diffusion material are shown in Table 4 below. Note that amount of fluorine is as much as 25 atomic-percent or 35 weight-percent in this material.

TABLE 4

Elemental Analogs of GDL (prior art)

| Elements | Wt % | At % |
|---|---|---|
| C | 64.95 | 74.56 |
| F | 35.05 | 25.44 |

Porosity and Pore Size Distribution

Figure 8:
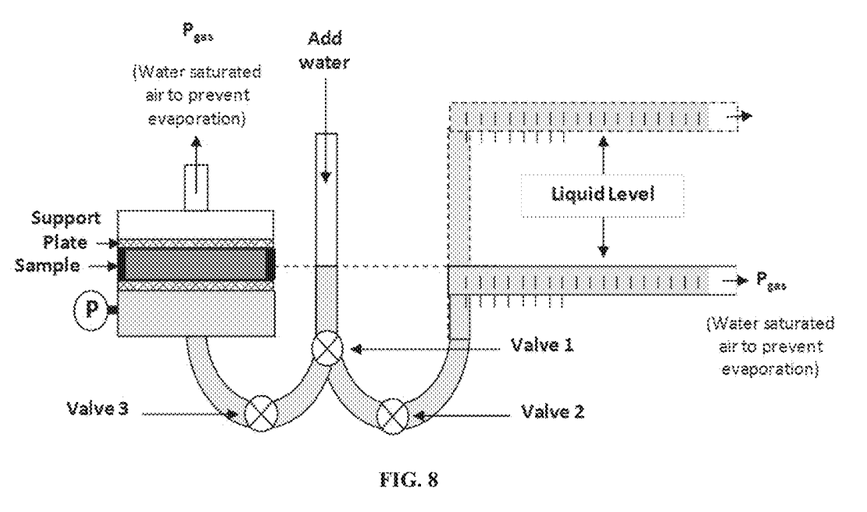
FIG. 8 illustrates an experimental set up for measuring the capillary pressure of the gas diffusion layer of the present invention.

The porosity and pore size distribution of the physically treated, chemically treated, and physically and chemically treated GDM will be measured by mercury intrusion porosimetry. Although mercury is non-wetting to carbon fibers, it penetrates into the porous GDM when pressure is applied. Pore size information may be extracted from the capillary data using the Young-Laplace equation:

$$r = \frac{2\sigma_{Hg-Air}\cos\theta_{Hg-Air}}{p_{c,Hg-Air}}$$

where r is the pore radius, $\sigma_{Hg-Air}$ the surface tension of the mercury-air interface, $\theta_{Hg-Air}$ the contact angle of mercury on the carbon graphite, and $P_{c,Hg-Air}$ the capillary pressure, respectively. This technique will give the total porosity of the sample. A schematic for performing this test is shown in FIG. 8.

To get the hydrophilic porosity, water porosimetry, which is very similar to the method used for capillary pressure curve measurement, can be used. In this technique, water instead of mercury is used as the intrusion fluid. Once the hydrophilic porosity is known, the hydrophobic porosity may be calculated by $\epsilon_{phobic} = \epsilon_{total} - \epsilon_{philic}$.

Neutron Imaging

Neutron imaging will also be used during hydrophilic porosity and capillary pressure measurements to elucidate how water imbibes and drains from these samples and whether continuous gas pathways were created in the samples by the hydrophobic phase. Note that since neutron penetrates carbon and PTFE but not water one would be able to see continuous gas channels from the region unoccupied by liquid water. The neutron imaging facility at NIST is capable of carrying out the task described here.

Spectroscopy Analysis

Various spectroscopy techniques can be used to analyze the fluorinated carbon materials. These include infrared, Fourier-transform infrared, electron spin resonance, X-ray photoelectron, and Raman spectroscopy. Due to the nature of the sample, we will attempt to apply two major techniques: X-ray photoelectron spectroscopy ("XPS") and laser Raman spectroscopy ("RS").

X-ray photoelectron spectroscopy, also known as electron spectroscopy for chemical analysis ("ESCA"), is an ultra-high-vacuum ("UHV") technique for surface chemical compositions analysis. With XPS, it is possible to identify the nature and the amount of fluorine containing groups attached to the surface of the carbon substrates (carbon fibers in GDL) because of the fluorination processes. The fluorine content in the GDL can be calculated based on the difference in weight before and after fluorination. However, this fluorine content is actually the ratio of fluorine to total carbon, which may depart significantly from the surface composite. The XPS result will directly reveal the surface elemental and chemical information of the coating. The fluorine to carbon ratios could be obtained by integrating the intensities of XPS C 1 s and F 1 s features. XPS spectra for a carbon sample before and after treatment by direct fluorination shown in FIG. 8 clearly illustrate the formation of the CF species on the carbon surface. The F/C ratio could be determined by the areas covered by F 1 s and C 1 s peaks. Assuming the fluorine species are chemically bonded to carbon, this will change the energy of the core electrons of the bonded carbon, resulting in a chemical shift. For example, chemical shifts of 4.7, 6.7, and 9.0 eV of $C_{1s}$ peak (about 285 eV) can be attributed to the surface group of CF, $CF_2$, and $CF_3$, respectively. With the current state of the art XPS system, an energy resolution of 0.5 eV can be achieved. High resolution XPS spectra will be collected to investigate the chemical nature of carbon fluorine bond.

Raman Spectroscopy ("RS") is an increasingly popular analytical technique because extensive sample preparation and high vacuum environment are not required. A Raman spectrum can also be used to identify the surface functional groups of the carbon materials. Typically, two classical bands, D mode (disorder) and G mode (graphite), result from defects on the carbon and the carbon-carbon stretching mode. The ratio ("R") of the intensities of the D band to that of the G band represents the structure and the degree of disorder of the carbon surface. For fluorinated carbon materials, R increases with the fluorination temperature, which directly correlates with the extent of fluorine compound formation on the carbon surface. For the un-treated carbon nano fibers ("CNFs"), the defects come mainly from the disordered edges of the nanotubes, which have a very small R ratio (small $I_D/I_G$).

Raman analysis for most material-of-interest is relatively easy and straightforward, requiring almost zero sample preparation. However, in the practical Raman analysis of fine carbon powders and carbon fibers, sample burning is a major concern. This is because the fine carbon materials exposed under a focused laser spot for extended period of time will tend to heat up and burn. Laser attenuation and forced sample cooling will be applied if necessary to circumvent this issue.

Fuel Cell Performance & Water Transport Across the Membrane

Electrodes with a catalyst loading of about 0.3-0.5 mg/cm$^2$ will be made using GDM that were physically treated, chemically treated, and both physically and chemically treated. To prepare a membrane electrolyte assembly ("MEA") the electrodes will be hot-pressed onto a Nafion® 112 membrane (1100 equivalent weight & 2 mil thickness) at 135° C. for 5 minutes with a pressure of 33 lb/cm$^2$. The MEA will be tested in a fuel cell with serpentine flow fields 60° C. with hydrogen and air fully humidified at high stoichiometric flow rates to 1) magnify the liquid water flooding effect and 2) minimize the effect of variation in the gas relative humidity along the flow channels.

To determine the effectiveness of the liquid water pressure generation capability of the modified gas diffusion materials at the cathode on the back transport rate of water from the cathode to the anode, the water content in the cathode and anode feed streams and effluents will be carefully controlled and accurately measured. Based on the water-balance measurements we can determine the net water transport rate across the membrane. An experimental setup similar to the one used by Karan et al. will be used.

GDM (GDL & MPL) Durability

Running the fuel cell performance testing continuously for a week or longer could test the durability of the GDMs in fuel cells. However, the fuel cell itself may complicate the problem because the other parts of the fuel cell, particularly the catalyst layer ("CL"), may age over time. Since the capillary pressure curve is probably the most important property of the GDM, this property will be selected as the indicator of the GDM durability. In a PEM fuel cell, the three parameters that have the greatest impacts on the durability of a GDM are temperature, water, and acidity (due to the leaching of the ionic groups from the membrane). To simulate the conditions in a PEM fuel cell and to shorten the testing time, the GDM will be soaked in a 1 M sulfuric acid solution at 80° C. Samples will be removed at some fixed time intervals, washed in DI water, dried, and measured for changes in the capillary pressure property.

Safety Issues

The fluorine content in the air is controlled because of its toxicity even in trace amounts. In this experiment, the un-reacted fluorine will be consumed by the sodium hydroxide solution. The operation will be carried out in a hood with sufficient venting. Since fluorine is inert to nickel up to 650° C. a nickel reactor will be safe for operational temperatures up to 550° C. Fluorine recirculation will be used during treatment to minimize the use of fluorine and need for fluorine treatment in the effluent. During nitrogen purge, sufficient time will be used to ensure that fluorine is completely removed from the reactor before the reactor is open and samples removed. An experiment will also be conducted to determine the amount and concentration of sodium hydroxide and the residence time of the effluent gas in the scrubber needed to completely treat all the fluorine gas.

Example 2

Those skilled in the art will appreciate that a gas diffusion layer may be comprised of a dense hydrophobic microporous layer added to the surface of the macroporous layer. The microporous layer is in contact with the catalyst layer in order to keep the CL/GDL interface free of liquid water and/or create a high capillary pressure boundary to drive liquid water back to the anode. As with the macroporous layer, the microporous layer is conventionally made wet-proof by adding PTFE. However, the microporous is conventionally made differently from the macroporous layer. While the macroporous layer is made of carbon fibers, which is later made wet-proof by coating the carbon fibers with PTFE, the microporous layer is made of carbon powder mixed with PTFE. The PTFE phase in the micro-porous layer is used both as a binder and as a wet-proofing material. In this approach, complete carbon surface coverage with PTFE is not possible because it will render this layer non-electrically conductive.

Figure 9:
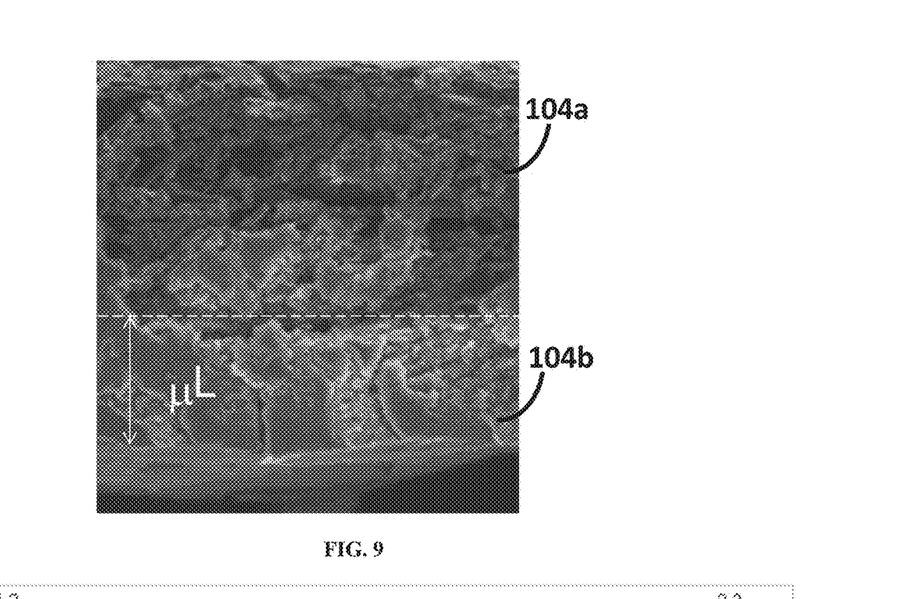
FIG. 9 is an SEM of a gas diffusion layer comprising a bilayer of a macroporous carbon substrate and a microporous carbon substrate that has been fluorinated in accordance with the present invention.

In this example, the gas diffusion layer was a bilayer comprising a macroporous substrate 104a and a microporous substrate 104b as shown in FIG. 9. More specifically, the gas diffusion layer comprised an untreated macroporous carbon substrate adjacent a microporous carbon substrate comprised of carbon powder mixed with PTFE commercially available from SGL Carbon (Product No. SGL 35AC). The mean pore size for the macroporous layer was about 15 to 30 microns, and the mean pore size for the microporous layer was about 1-3 microns. The gas diffusion bilayer was directly fluorinated at about 350 to 450° C. using the methods discussed herein. The $F_2$-treated bilayer was then placed on a high grade sandpaper (grade 1500) and lightly rotated a few times over the sandpaper. This sanding step was repeated for the other side of the gas diffusion bilayer. The major surfaces were then wiped with isopropanol to clean the surfaces. The resulting gas diffusion layer was thus a bilayer having a first major surface comprised of the microporous carbon substrate and a second major surface comprised of the macroporous carbon substrate. The gas diffusion layer was directly fluorinated in the interior and was substantially free of fluorination on the first major surfaces and second major surfaces.

Figure 10:
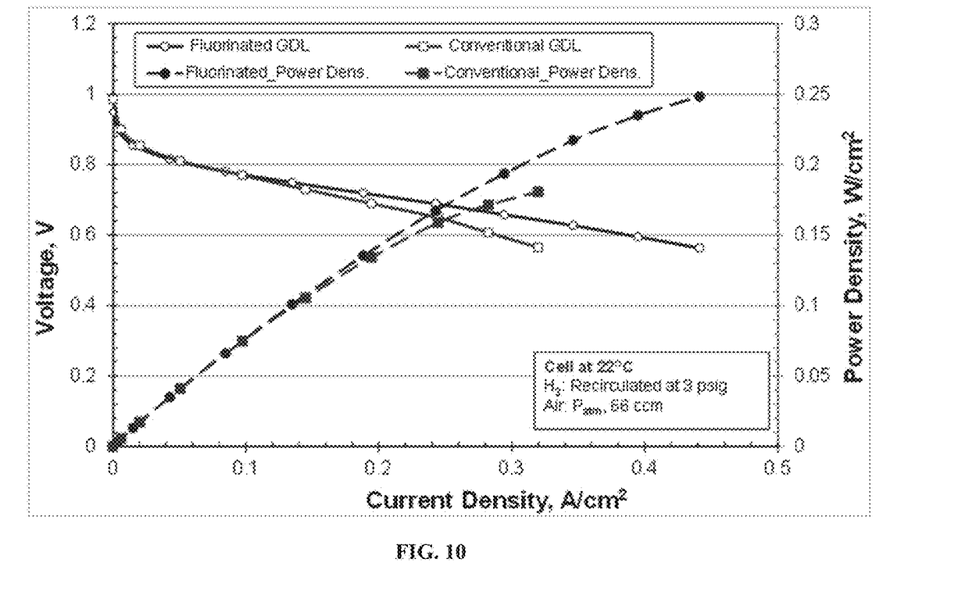
FIG. 10 illustrates the test results of two fuel cells in which the one is made of a commercial bilayer gas diffusion material and that the other is made of a directly fluorinated bilayer gas diffusion material in accordance with the present invention.

Test results for two fuel cells in which the cathode in one is made of a commercial bilayer gas diffusion material and that in the other is made of directly fluorinated bilayer gas diffusion material are shown in FIG. 10. The commercial bilayer material consisted of a macroporous layer treated by the conventional PTFE coating process and a microporous layer consisting of a mixture of carbon powder and PTFE. The commercial bilayer was obtained from SGL Carbon (Product No. SGL 35BC). The results show that the fuel cell that had the cathode made of direct fluorination bilayer gas diffusion material delivered much better performance (more than 50% higher peak power) than that with conventional material.

All publications, patents, patent applications, databases, and other references cited in this application are incorporated by reference in their entirety as if each individual publication, patent, patent application, database, or other reference were specifically and individually indicated to be incorporated by reference.

Atiyeh et al., Experimental *Investigation of the Role of a Microporous Layer on the Water Transport and Performance of a PEM Fuel Cell*, Journal of Power Sources 170 111-121 (2007).

Ayala et al., *Nano- and Micro-Scale Wear of Fluorinated Carbon Films*, Surface & Coatings Technology 182(2-3) 335-341 (2004).

Bottani et al., Structure *and Mechanical Properties of PACVD Fluorinated Amorphous Carbon Films*, Thin Solid Films 433(1-2) 149-154 (2003).

Budarin et al., *Chemical Modification of Activated Carbons*, Journal of Thermal Analysis and calorimetry, 62(2) 349-352 (2000).

Chamssedine et al., *A Kinetic, Morphological and Mechanistic Approach of the Fluorination of Multiwall Carbon Nanotubes*, Chemical Physics Letters 454(4-6), 252-256 (2008).

Cheng et al., Reactive *Sensor for Investigation of Gas Diffusion Layer Hydrophobicity in PEM Fuel Cells*, Electrochemical and Solid-State Letters 11(8) B148-B152 (2008).

Dai et al., Measurement *of Water Transport Rates Across the Gas Diffusion Layer in a Proton Exchange Membrane Fuel Cell, and the Influence of Polytetrafluoroethylene Content and Micro-Porous Layer*, Journal of Power Sources 188 122-126 (2009).

Delabarre et al., Highly *Fluorinated Graphite Prepared from Graphite Fluoride Formed Using BF3 Catalyst*, Journal of Fluorine Chemistry 126(7) 1078-1087 (2005).

Fairweather et al., *A Microfluidic Approach for Measuring Capillary Pressure in PEMFC Gas Diffusion Layers*, Electrochemistry Communications 9 2340-2345 (2007).

Fridman, Plasma *chemistry*, p. xlii, Cambridge University Press, Cambridge, New York (2008).

Fujimoto et al., *New Fluorine-Carbon Compound Prepared by the Direct Fluorination of Mesophase Pitch*, Carbon 30(6) 851-857 (1992).

Gostick et al., *Capillary Pressure and Hydrophilic Porosity in Gas Diffusion Layers for Polymer Electrolyte Fuel Cells*, Journal of Power Sources 156(2) 375-387 (2006).

Gostick et al., On *the Role of the Microporous Layer in PEMFC Operation*, Electrochemistry Communications 11 576-579 (2009).

Groult et al., Surface *Modification of Carbonaceous Materials by Fluorinated Gases and Use as Anode in Lithium-Ion Battery*, ESC Transactions 3(36) 167-176 (2007).

Gurin et al., *Synthesis and Characterization of Highly Fluorinated Graphite Containing sp(2) and sp(3) Carbon*, Chemistry of Materials 16(9) 1786-1792 (2004).

Gyoten et al., Fuel Cell and Method of Manufacture Thereof, European Patent No. 1117142 A1 (2001).

Hamwi et al., *Fluorination of Carbon Nanotubes*, Carbon 35(6) 723-728 (1997).

Hamwi et al., *Graphite Fluorides Prepared at Room-Temperature 1. Synthesis and Characterization*, Synthetic Metals 26(1) 89-98 (1988).

Harkness et al., *The Use of a Novel Water Porosimeter to Predict the Water Handling Behaviour of Gas Diffusion Media Used in Polymer Electrolyte Fuel Cells*, Journal of Power Sources 193 122 (2009).

Hayashi et al., *Selective Optical Property Modification of Double-Walled Carbon Nanotubes by Fluorination*, ACS Nano 2(3) 485-488 (2008).

Holmstrom et al., *The Influence of the Gas Diffusion Layer on Water Management in Polymer Electrolyte Fuel Cells*, Fuel Cells 7 306-313 (2007).

Hong et al., Superhydrophobicity *of a Material Made from Multiwalled Carbon Nanotubes*, Applied Physics Letters 88(24) 244101 (2006).

Hsieh et al., *Superhydrophobic Behavior of Fluorinated Carbon Nanofiber Arrays*, Applied Physics Letters 88(24) 243120 (2006).

Huang et al., *Effect of Water Management Schemes on the Membrane Durability in PEMFCs*, ECS Transactions, 16 (2), 1697-1703 (2008).

Jacobsohn et al., *Structural and Mechanical Characterization of Fluorinated Amorphous-Carbon Films Deposited by Plasma Decomposition of CF4-CH4 Gas Mixtures*, Journal of Vacuum Science & Technology A 18(5) 2230-2238 (2000).

Karan et al., *An Experimental Investigation of Water Transport in PEMFCs—The Role of Microporous Layers*, Electrochemical and Solid-State Letters 10 B34-B38 (2007).

Kusano et al., *Surface Treatment Method*, U.S. Pat. No. 5,041,304 (1991).

Lau et al., *Superhydrophobic Carbon—Nanotube Forests*, Nano Letters 3(12) 1701-1705 (2003).

Li et al., *Fluorinated Carbon with Ordered Mesoporous Structure*, Journal of the American Chemical Society 126(40) 12782-12783 (2004).

Lim et al., *Effects of Hydrophobic Polymer Content in GDL on Power Performance of a PEM Fuel Cell*, Electrochimica Acta 49(24) 4149-4156 (2004).

Lin et al., Effect *of Thickness and Hydrophobic Polymer Content of the Gas Diffusion Layer on Electrode Flooding Level in a PEMFC*, Journal of the Electrochemical Society 152 A1942-A1948 (2005).

Lin et al., Effect *of Thickness and Hydrophobic Polymer Content of The Gas Diffusion Layer on Electrode Flooding Level in a PEMFC*, Journal of the Electrochemical Society 152(10) A1942-A1948 (2005).

Liu et al., *Effect of Operation Conditions on Membrane Durability in PEM Fuel Cells, Proton Exchange Membrane Fuel Cells V: Durability and Reliability of Low-Temperature Fuel Cells and Fuel Cell Systems*, Electrochemical Society 2005 Annual Meeting, Paper No. 1191, Los Angeles, Calif., Oct. 16-21, 2005.

Merfeld et al., *Plasma Fluorination of Graphite*, Journal of Vacuum Science & Technology A-Vacuum Surfaces and Films 12(2) 365-368 (1994).

Mittal et al., *Factors Accelerating Membrane Degradation Rate and the Underlying Degradation Mechanism in PEMFC*, Proton Exchange Membrane Fuel Cells V: Durability and Reliability of Low-Temperature Fuel Cells and Fuel Cell Systems, Electrochemical Society 2005 Annual Meeting, Paper No. 1192, Los Angeles, Calif., Oct. 16-21, 2005.

Muramatsu et al., *Fluorination of Double-Walled Carbon Nanotubes*, Chemical Communications 15 2002-2004 (2005).

Nakajima et al., *Surface Structure and Electrochemical Characteristics of Graphite Fluorinated by Elemental Fluorine and Plasma Treatment Using CF4*, Molecular Crystals and Liquid Crystals 388 517-522 (2002).

Nam et al., *Effective Diffusivity and Water-Saturation Distribution in Single- and Two-Layer PEMFC Diffusion Medium*, International Journal of Heat and Mass Transfer 46 4595-4611 (2003).

Nguyen et al., *Measurement of Capillary Pressure Property of Gas Diffusion Media Used in PEM Fuel Cells*, Electrochemical and Solid-State Letters 11(8) B127 (2008).

Nguyen et al., *Measurements of Two-Phase Flow Properties of the Porous Media Used in PEM Fuel Cells*, ECS Transactions Vol. 3, No. 1 415-423 (2006).

Nguyen et al., *Optimized Catalyst Layer Structure for PEM Fuel Cells*, Proton Exchange Membrane Fuel Cells V: Cell Design, Electrochemical Society 2005 Annual Meeting, Paper No. 996, Los Angeles, Calif., Oct. 16-21, 2005. (2005 ECS meeting volume is available at http://www.ecsdl.org/dbt/dbt.jsp?KEY=ECSTF8)

Nguyen, *Water Management in PEM Fuel Cells by Material Engineering*, Award #0651758 from NSF-CBET Division, Apr. 1, 2007-Mar. 31, 2010.

Ohn et al., *Capillary Pressure Properties of Gas Diffusion Materials Used in PEM Fuel Cells*, Proton Exchange Membrane Fuel Cells V: Membranes II, Electrochemical Society 2005 Annual Meeting, Paper No. 1186, Los Angeles, Calif., Oct. 16-21, 2005. (2005 ECS meeting volume is available at http://www.ecsdl.org/dbt/dbt.jsp?KEY=ECSTF8)

Ohn, *Measurement of Capillary Pressure Properties of Gas Diffusion Materials Used in Proton Exchange Membrane Fuel Cells*, M.S. Thesis, Department of Chemical and Petroleum Engineering, University of Kansas, Lawrence, Kans., USA (July 2007).

Pai et al., *CF4 Plasma Treatment for Preparing Gas Diffusion Layers in Membrane Electrode Assemblies*, Journal of Power Sources 161(1) 275-281 (2006).

Park et al., Effect *of Carbon Loading in Microporous Layer on PEM Fuel Cell Performance*, J. Power Sources 163 357-363 (2006).

Park et al., *Effect of PTFE Content in Microporous Layer on Water Management in PEM Fuel Cells*, Journal of Power Sources 177 457-463 (2008).

Pasaogullari et al., *Two-Phase Transport and the Role of Micro-Porous Layer in Polymer Electrolyte Fuel Cells*, Electrochimica Acta 49 4359-4369 (2004).

Pasaogullari et al., Two-*Phase Transport in Polymer Electrolyte Fuel Cells with Bilayer Cathode Gas Diffusion Media*, Journal of the Electrochemical Society 152 A1574-A1582 (2005).

Powell et al., Method of Production of Fluorinated Carbon Nanostructures, U.S. Patent Publication No. 2008/0090080 (2008).

Qi et al., *Improvement of Water Management by a Microporous Sublayer for PEM Fuel Cells*, Journal of Power Sources 109 38-46 (2002).

Ramasamy et al., *Investigation of Macro- and Micro-Porous Layer Interaction in Polymer Electrolyte Fuel Cells*, International Journal of Hydrogen Energy 33 3351-3367 (2008).

Sayers et al., Industrial Fabrics and Method of Treatment, WO Patent No. 99/05358, (1999).

Shirafuji et al., *Plasma Enhanced Chemical Vapor Deposition of Fluorinated Amorphous Carbon Thin Films from Tetrafluoroethylene and Tetraisocyanatesilane*, Plasma and Polymers 3(2) 115-127 (1998).

Song et al., *Effect of Wet-proofing Treatment of Carbon Backing Layer in Gas Diffusion Electrodes on the PEFC Performance*, Electrochemistry 73(3) 189-193 (2005).

Tang et al., *Porosity-Graded Micro-Porous Layers for Polymer Electrolyte Membrane Fuel Cells*, Journal of Power Sources 166 41-46 (2007).

*Threshold Limits for Airborne Contaminants*, In *CRC handbook of chemistry and physics*, 88th Edition (internet version 2008), D. R. Lide, Ed. CRC Press/Taylor and Francis, Boca Raton, Fla., 16-29 (2008).

Tsubokawa et al., *Surface Modification of Inorganic Ultrafine Particles by the Grafting of Polymers*, Proceedings of the Eleventh International Conference on Composite Materials, Gold Coast, Queensland, Australia, 537-546 (1997).

Tsubokawa, Carbon Black (*Graft Copolymers*), In Polymeric Materials Encyclopedia, J. C. Salamone, Ed., CRC, Vol. 2, 941-946 (1996).

Valentini et al., *Fluorinated Amorphous Carbon Films Prepared by Plasma Enhanced Chemical Vapor Deposition for Solar Cell Applications*, Journal of Vacuum Science & Technology A 21(5) 1784-1790 (2003).

Velayutham et al., *Effect of PTFE Content in Gas Diffusion Media and Microlayer on the Performance of PEMFC Tested under Ambient Pressure*, Fuel Cells 7 314-318 (2007).

Wang et al., *A Bi-Functional Micro-Porous Layer with Composite Carbon Black for PEM Fuel Cells*, Journal of Power Sources 162 474-479 (2006).

Wang et al., *Effects of Two-Phase Transport Properties of Porous Materials on the Performance of the Cathode of a PEM Fuel Cell*, Journal of the Electrochemical Society 155 (11) B1085-B1092 (2008).

Wang et al., *Micro-Porous Layer with Composite Carbon Black for PEM Fuel Cells*, Electrochimica Acta 51 4909-4915 (2006).

Wang et al., *Modeling the Effects of the Cathode Micro-Porous Layer on the Performance of a PEM Fuel Cell*, ECS Transactions 16 No. 2, 3-12 (2008).

Wang et al., *Treatment and Characterization of Gas Diffusion Layers by Sucrose Carbonization for PEMFC Applications*, Electrochemistry Communications 10(4) 555-558 (2008).

Weber et al., *Effects of Microporous Layers in Polymer Electrolyte Fuel Cells*, Journal of the Electrochemical Society 152 A677-A688 (2005).

Yao et al., *Effects of Negative Low Substrate Bias Voltage on the Structure and Properties of Fluorinated Amorphous Carbon Films Synthesized by Plasma Immersion Ion Implantation and Deposition*, Surface & Coatings Technology 186(1-2) 131-135 (2004).

Yi et al., *Low Dielectric Fluorinated Amorphous Carbon Thin Films Grown From C6F6 and Ar Plasma*, Thin Solid Films 374(1) 103-108 (2003).

Yokomichi et al., *Preparation of Fluorinated Amorphous Carbon Thin Films*, Journal of Non-Crystalline Solids 230 641-644 (1998).

Yudanov et al., *Fluorination of Arc-Produced Carbon Material Containing Multiwall Nanotubes*, Chemistry of Materials, 14(4) 1472-1476 (2002).

Zhang et al., *Carbon Nanofibres Fluorinated Using TbF4 as Fluorinating Agent. Part I: Structural Properties*, Carbon 46(7) 1010-1016 (2008).

Zhang et al., *Carbon Nanofibres Fluorinated Using TbF4 as Fluorinating Agent. Part II: Adsorption and Electrochemical Properties*, Carbon 46(7) 1017-1024 (2008).

Zhou et al., *Superhydrophobic Surfaces Prepared by Plasma Fluorination of Lotus-Leaf-Like Amorphous Carbon Films*, Surface Review and Letters 13(1) 117-122 (2006).

From the foregoing it will be seen that this invention is one well adapted to attain all ends and objectives hereinabove set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A gas diffusion layer having electron conductivity and gas diffusibility, the gas diffusion layer having a first major surface and a second major surface which is positioned opposite to said first major surface and an interior between said first and second major surfaces; wherein said gas diffusion layer comprises a porous carbon substrate having interior pores with interior pore surfaces, which interior pore surfaces have been directly fluorinated and wherein said gas diffusion layer is substantially free of fluorination on at least one of said first major surface or said second major surface.

2. The gas diffusion layer of claim 1 wherein at least about 80% of the surface area of the first major surface is not fluorinated.

3. The gas diffusion layer of claim 1 wherein at least about 80% of the surface area of the first major surface is not fluorinated and at least 80% of the surface area of the second major surface is not fluorinated.

4. The gas diffusion layer of claim 1 wherein gas diffusion layer contains less than about 2 wt % fluorine.

5. The gas diffusion layer of claim 1 in which said porous carbon substrate comprises a macroporous carbon substrate adjacent a microporous carbon substrate such that the gas diffusion layer is a bilayer having said first major surface comprised of the microporous carbon substrate and said second major surface comprised of the macroporous carbon substrate.

6. The gas diffusion layer of claim 5 wherein at least about 60% of the surface area of the first major surface is not fluorinated.

7. The gas diffusion layer of claim 5 wherein at least about 60% of the surface area of the first major surface is not fluorinated and at least 60% of the surface area of the second major surface is not fluorinated.

8. A fuel cell comprising the gas diffusion layer of claim 1.

9. The fuel cell of claim 8, comprising two of said gas diffusion layers.

10. The fuel cell of claim 8, further comprising:
a membrane-electrode assembly including a polymer electrolyte membrane; and
a pair of catalyst layers sandwiching said polymer electrolyte membrane.

11. The fuel cell of claim 10, wherein the polymer electrolyte membrane is a proton exchange membrane.

12. The fuel cell of claim 8 wherein at least about 80% of the surface area of the first major surface of the gas diffusion layer is not fluorinated.

13. The fuel cell of claim 8 wherein at least about 80% of the surface area of the first major surface of the gas diffusion layer is not fluorinated and at least 80% of the surface area of the second major surface of the gas diffusion layer is not fluorinated.

14. The fuel cell of claim 8 wherein the gas diffusion layer contains less than about 2 wt % fluorine.

15. The fuel cell of claim 8 in which said porous carbon substrate of the gas diffusion layer comprises a macroporous carbon substrate adjacent a microporous carbon substrate such that the gas diffusion layer is a bilayer having said first major surface comprised of the microporous carbon substrate and said second major surface comprised of the macroporous carbon substrate.

16. The fuel cell of claim 8 wherein at least about 60% of the surface area of the first major surface of the gas diffusion layer is not fluorinated.

17. The fuel cell of claim 8 wherein at least about 60% of the surface area of the first major surface of the gas diffusion layer is not fluorinated and at least 60% of the surface area of the second major surface of the gas diffusion layer is not fluorinated.

18. The gas diffusion layer of claim 1, wherein said direct fluorination comprises contacting said interior pore surfaces with fluorine gas.

19. The gas diffusion layer of claim 1, wherein all of said interior pore surfaces are covered with fluorine.

20. A fuel cell comprising:
a membrane-electrode assembly including a hydrogen ion conductive polymer electrolyte membrane;
a pair of catalyst layers sandwiching said polymer electrolyte membrane;
and a pair of gas diffusion layers disposed on the outer surfaces of said catalyst layers;
the gas diffusion layers having electron conductivity and gas diffusibility, the gas diffusion layers each having a first major surface and a second major surface which is positioned opposite to said first major surface and an interior between said first and second major surfaces;
wherein said gas diffusion layers comprise a porous carbon substrate having interior pores with interior pore surfaces, which interior pore surfaces have been directly fluorinated, and wherein said gas diffusion layer is substantially free of fluorination on at least one of said first major surface or said second major surface.

21. The fuel cell of claim 20 wherein at least about 80% of the surface area of the first major surface is not fluorinated.

22. The fuel cell of claim 20 wherein at least about 80% of the surface area of the first major surface is not fluorinated and at least 80% of the surface area of the second major surface is not fluorinated.

23. The fuel cell of claim 20 wherein at least one gas diffusion layer contains less than about 2 wt % fluorine.

24. The fuel cell of claim 20 in which said porous carbon substrate comprises a macroporous carbon substrate adjacent a microporous carbon substrate such that the gas diffusion layer is a bilayer having said first major surface comprised of the microporous carbon substrate and said second major surface comprised of the macroporous carbon substrate.

25. The fuel cell of claim 20 wherein at least about 60% of the surface area of the first major surface is not fluorinated.

26. The fuel cell of claim 20 wherein at least about 60% of the surface area of the first major surface is not fluorinated and at least 60% of the surface area of the second major surface is not fluorinated.

* * * * *

UNITED STATES PATENT AND TRADEMARK OFFICE
CERTIFICATE OF CORRECTION

| | | |
|---|---|---|
| PATENT NO. | : 9,825,315 B2 | Page 1 of 1 |
| APPLICATION NO. | : 14/372824 | |
| DATED | : November 21, 2017 | |
| INVENTOR(S) | : Trung Van Nguyen et al. | |

It is certified that error appears in the above-identified patent and that said Letters Patent is hereby corrected as shown below:

In the Specification

Column 1,
Line 13, insert the following:
--STATEMENT REGARDING FEDERALLY SPONSORED RESEARCH
This invention was made with government support under Grant No. EFRI-1038234 awarded by the National Institutes of Health. The government has certain rights in the invention.--

Signed and Sealed this
Twenty-fourth Day of April, 2018

Andrei Iancu
*Director of the United States Patent and Trademark Office*

UNITED STATES PATENT AND TRADEMARK OFFICE
CERTIFICATE OF CORRECTION

PATENT NO. : 9,825,315 B2
APPLICATION NO. : 14/372824
DATED : November 21, 2017
INVENTOR(S) : Trung Van Nguyen et al.

Page 1 of 1

It is certified that error appears in the above-identified patent and that said Letters Patent is hereby corrected as shown below:

In the Specification

Column 1,
Delete the text for "STATEMENT REGARDING FEDERALLY SPONSORED RESEARCH" on Lines 13 through 15 and insert the following:
--STATEMENT REGARDING FEDERALLY SPONSORED RESEARCH
This invention was made with government support under EFRI1038234 awarded by the National Science Foundation. The government has certain rights in the invention.--

This certificate supersedes the Certificate of Correction issued April 24, 2018.

Signed and Sealed this
Fourteenth Day of April, 2020

Andrei Iancu
*Director of the United States Patent and Trademark Office*